US012583612B2

(12) United States Patent
Johnson et al.

(10) Patent No.: US 12,583,612 B2
(45) Date of Patent: Mar. 24, 2026

(54) AIRCRAFT ASSEMBLY

(71) Applicant: AIRBUS OPERATIONS LIMITED, Bristol (GB)

(72) Inventors: Callum Johnson, Bristol (GB); Anthony Bryant, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 186 days.

(21) Appl. No.: 18/518,864

(22) Filed: Nov. 24, 2023

(65) Prior Publication Data

US 2024/0174374 A1 May 30, 2024

(30) Foreign Application Priority Data

Nov. 25, 2022 (GB) ...................................... 2217746

(51) Int. Cl.
| | |
|---|---|
| *F16L 5/00* | (2006.01) |
| *B64D 37/30* | (2006.01) |
| *F16L 3/10* | (2006.01) |

(52) U.S. Cl.
CPC ................ *B64D 37/30* (2013.01); *F16L 3/10* (2013.01); *F16L 5/00* (2013.01)

(58) Field of Classification Search
CPC . F16B 9/056; F16B 9/052; F16L 41/12; F16L 41/088; F16L 39/04; F16L 5/025;
(Continued)

(56) References Cited

U.S. PATENT DOCUMENTS

| | | | | |
|---|---|---|---|---|
| 917,847 | A | * | 4/1909 | Corey .................... H01B 17/02 |
| | | | | 174/161 R |
| 3,565,466 | A | * | 2/1971 | Mullings ............... F16L 41/088 |
| | | | | 16/2.3 |

(Continued)

FOREIGN PATENT DOCUMENTS

| | | | | |
|---|---|---|---|---|
| DE | 4444011 | C1 * | 4/1996 | ............. F16L 5/025 |
| DE | 102005047951 | A1 | 4/2007 | |

(Continued)

OTHER PUBLICATIONS

European Search Report cited in EP 23211202.9, mailed Apr. 11, 2024, 6 pages.
(Continued)

*Primary Examiner* — Matthew Troutman
*Assistant Examiner* — James A Linford
(74) *Attorney, Agent, or Firm* — Nixon & Vanderhye P.C.

(57) ABSTRACT

An aircraft assembly including: an aircraft structure; a pipe assembly; a fixture arrangement attached to the aircraft structure, the fixture arrangement contacting the pipe assembly via a curved bearing surface having curvature in two orthogonal directions; the curved bearing surface configured to enable the pipe assembly to rotate relative to the fixture arrangement about three perpendicular axes; wherein the pipe assembly comprises a stop member adjacent the fixture arrangement, a contact surface of the stop member configured to abut a contact surface of the fixture arrangement so as to restrict axial movement of the pipe assembly relative to the fixture arrangement, and wherein a distance between the contact surface of the fixture arrangement and the contact surface of the stop member increases radially from the longitudinal pipe axis.

22 Claims, 9 Drawing Sheets

(58) Field of Classification Search
CPC ..... F16L 3/16; F16L 3/20; F16L 3/205; F16L 3/04
See application file for complete search history.

(56) References Cited

U.S. PATENT DOCUMENTS

| | | | | |
|---|---|---|---|---|
| 4,136,986 A * | 1/1979 | Grashow | ............. | H01Q 1/3275 |
| | | | | 403/197 |
| 8,127,801 B2 | 3/2012 | Brower | | |
| 10,293,952 B2 | 5/2019 | James et al. | | |
| 2014/0144002 A1 * | 5/2014 | Conchi, Jr. | ............... | F16L 5/00 |
| | | | | 285/61 |

FOREIGN PATENT DOCUMENTS

| | | | | | |
|---|---|---|---|---|---|
| EP | 2634467 A1 | | 9/2013 | | |
| EP | 3604121 A1 | | 2/2020 | | |
| FR | 3015624 A1 | * | 6/2015 | .......... | F16C 11/0614 |
| GB | 2572021 A | * | 9/2019 | .......... | B64D 37/005 |
| GB | 2576893 A | | 3/2020 | | |
| GB | 2577518 A | * | 4/2020 | .......... | F16C 11/0614 |
| GB | 2584882 A | | 12/2020 | | |
| WO | WO-2005106306 A1 | * | 11/2005 | .......... | B64D 37/005 |

OTHER PUBLICATIONS

Combined Search and Examination Report for GB2217746.3 dated May 18, 2023, 4 pages.

* cited by examiner

1

3

4

2

AIRCRAFT ASSEMBLY

RELATED APPLICATION

This application incorporates by reference and claims priority to United Kingdom patent application GB 2217746.3, filed Nov. 25, 2022.

FIELD OF THE INVENTION

The present invention relates to an aircraft assembly comprising a pipe assembly rotatable relative to a fixture arrangement of an aircraft structure, and an aircraft comprising the aircraft assembly.

BACKGROUND OF THE INVENTION

Hydrogen fuel lines are typically double-walled, with the interspace between the inner and outer pipes maintained at vacuum pressure to reduce thermal transfer between the fuel and atmosphere, and thereby maintain the cryogenic temperature of the fuel.

Hydrogen fuel lines are generally quite thick and typically span long distances across the aircraft wing between the fuel tanks and engines, or fuel tanks and refuel couplings, with the fuel lines expected to bend and twist in accordance with the bend and twist of the wing. The fuel lines attach to at least some of those ribs, presenting a need for fixture arrangements that minimise stress concentrations caused by over-constraint of the fuel lines.

SUMMARY

A first aspect of the invention provides an aircraft assembly comprising: an aircraft structure; a pipe assembly; a fixture arrangement attached to the aircraft structure, the fixture arrangement contacting the pipe assembly via a curved bearing surface having curvature in two orthogonal directions; the curved bearing surface configured to enable the pipe assembly to rotate relative to the fixture arrangement about three perpendicular axes; wherein the pipe assembly comprises a stop member adjacent the fixture arrangement, a contact surface of the stop member configured to abut a contact surface of the fixture arrangement so as to restrict axial movement of the pipe assembly relative to the fixture arrangement, and wherein a distance between the contact surface of the fixture arrangement and the contact surface of the stop member increases radially from the longitudinal pipe axis.

With this arrangement a simple, compact and lightweight solution for restricting the axial movement of the pipe assembly is provided, whilst permitting rotational movement of the pipe assembly. The simple nature of the design allows design tolerances to be increased/relaxed, thereby reducing manufacturing lead times and costs.

The distance between the contact surface of the fixture arrangement and the contact surface of the stop member may increase exponentially. This allows the arrangement to better account for the rotation of the pipe assembly relative to the fixture arrangement, maintaining more consistent contact therebetween so as to reduce stress concentrations.

The contact surface of the stop member may be angled relative to a plane normal to the longitudinal pipe axis. This allows the fixture arrangement to adopt a contact surface parallel to the plane of the aircraft structure, and thereby permits a more direct load path through the fixture arrangement whilst minimising stress concentrations.

The contact surface of the fixture arrangement may lie on a plane normal to the longitudinal pipe axis. With this arrangement, a more direct load path is provided through the fixture arrangement to the pipe assembly.

The contact surface of the stop member may be curved in two orthogonal directions. This allows the contact surface of the stop member to better account for the rotation of the pipe assembly relative to the fixture arrangement, maintaining more consistent contact therebetween so as to reduce stress concentrations.

A curvature of the curved bearing surface may match a curvature of the contact surface of the stop member. This allows contact to be made consistently as the pipe assembly is rotated relative to the fixture arrangement.

The curved bearing surface may be on the fixture arrangement. This can allow rotation of the pipe assembly relative to the fixture arrangement.

The curved bearing surface may contact a cylindrical bearing surface of the pipe assembly. This maintains a simple construction of the pipe assembly, whilst minimising contact with the fixture arrangement when in combination with a curved bearing surface on the fixture arrangement.

The stop member may be formed of two or more parts that interconnect circumferentially. This provides an easier means of assembling the stop member, for example after assembly of the rest of the pipe assembly into the aircraft assembly.

The pipe assembly may comprise a second stop member adjacent the fixture arrangement such that the fixture arrangement is between the first and second stop members, wherein a contact surface of the second stop member is configured to abut a second contact surface of the fixture arrangement so as to restrict axial movement of the pipe assembly relative to the fixture arrangement, and wherein a distance between the contact surface of the fixture arrangement and the contact surface of the second stop member increases radially from the longitudinal pipe axis.

This provides restricted axial movement of the pipe assembly in both directions along the axis of the pipe assembly.

The pipe assembly may have a plane of symmetry that lies between the first and second stop members. This provides a simple construction that can provide the same restriction on movement at either end.

The first and second stop members may be connected by a collar, and wherein the collar contacts the fixture arrangement at the curved bearing surface. This allows the first and second stop members to be manufactured and assembled together.

The axial movement of the pipe assembly relative to the fixture arrangement will be set depending on manufacturing tolerances and thermal effects.

The axial movement of the pipe assembly relative to the fixture arrangement may be restricted by the first and second stop members with axial movement no greater than 10 mm, or no greater than 5 mm.

The axial movement of the pipe assembly relative to the fixture arrangement may be restricted by the first and second stop members with axial movement of at least 2 mm.

The pipe assembly may comprise an inner pipe within an outer pipe.

The aircraft assembly may comprise a cryogenic fuel in the inner pipe. Thermal contraction can be a particular issue when dealing with cryogenic fuels, particularly as the pipes are generally thicker and thereby increase the rigidity of the pipes, as well as the disparity of temperatures acting on the inner and outer pipes.

The cryogenic fuel may be liquid hydrogen.

The aircraft assembly may comprise a vacuum pressure between the inner pipe and the outer pipe.

A further aspect of the invention provides an aircraft comprising the aircraft structure of the first aspect.

The aircraft structure may be a wing rib, fairing rib, or fuselage frame.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
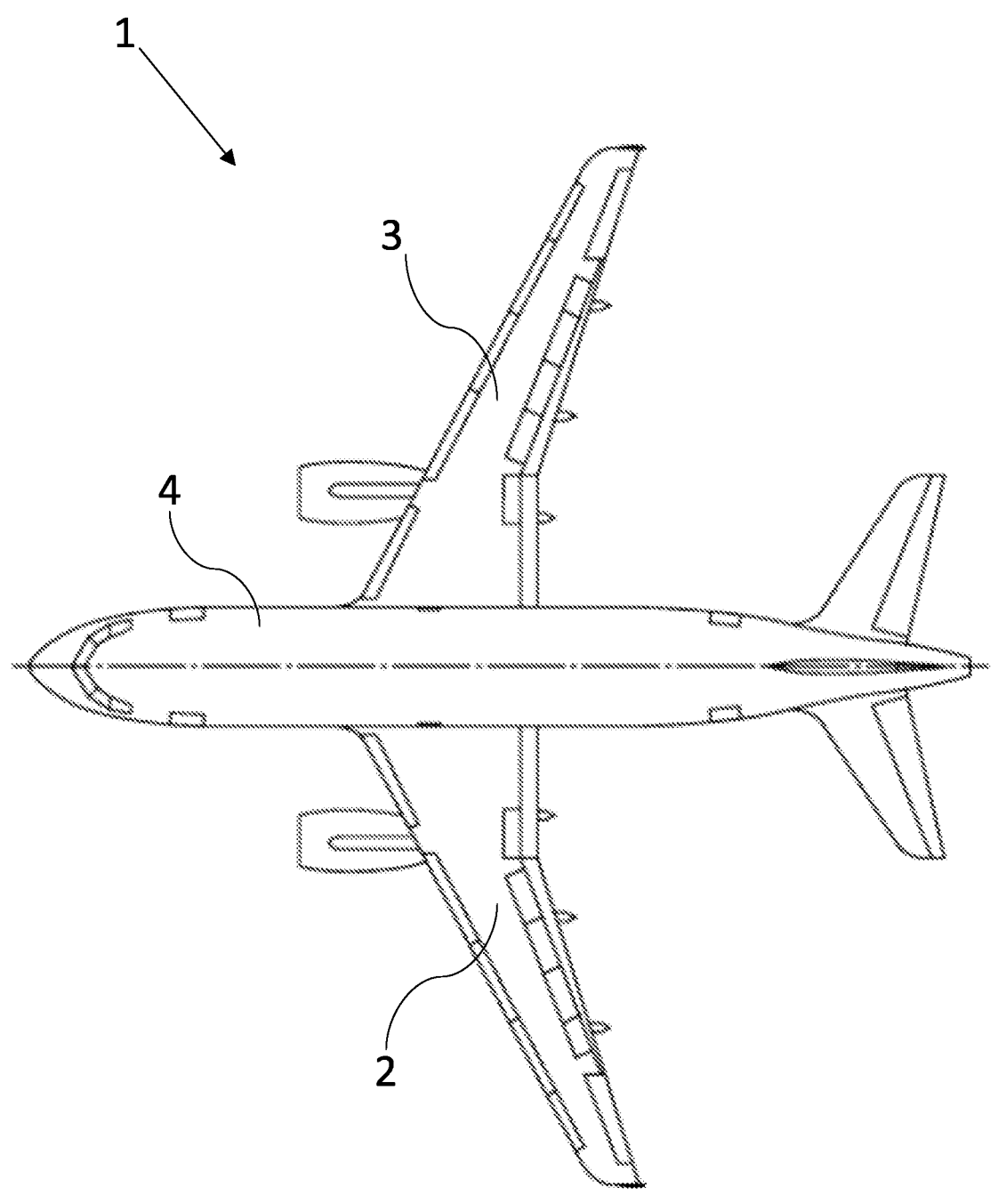
FIG. 1 shows an aircraft.

FIG. 1 shows an aircraft 1 with port and starboard wings 2, 3. Each wing has a cantilevered structure with a length extending in a generally spanwise direction 19 from a root to a tip (shown in FIG. 3), the root being joined to an aircraft fuselage 4. The wings 2, 3 are similar in construction so only the starboard wing 3 will be described in detail with reference to FIGS. 2 and 3.

Figures 2, 3:
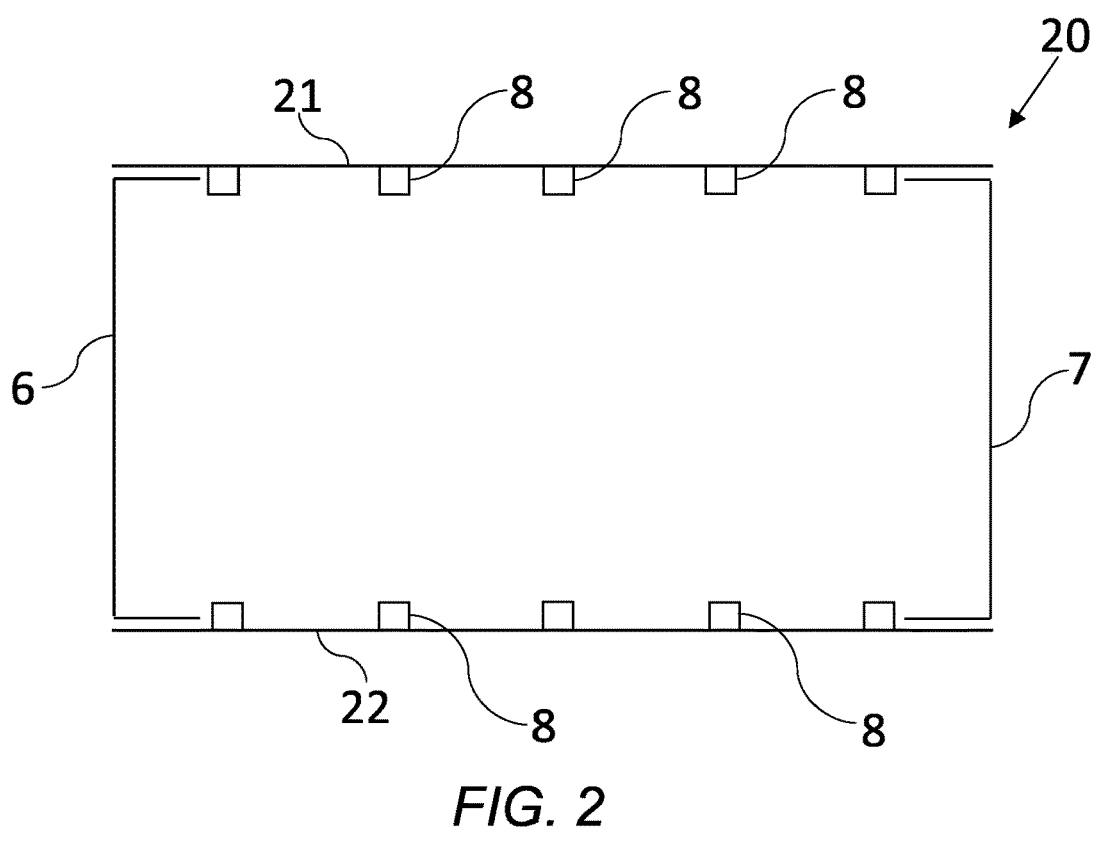
FIG. 2 is a sectional view of a wing box of the starboard wing.
FIG. 3 shows the wing box extending along a wing.

The main structural element of the wing 3 is a wing box 20 that may be formed by upper and lower covers 21, 22 and front and rear spars 6, 7 shown in cross-section in FIG. 2. The covers 21, 22 and spars 6, 7 may each be formed of Carbon Fibre Reinforced Polymer (CFRP) laminate components. Each cover 21, 22 comprises a panel assembly and may have a curved aerodynamic outer surface (e.g. the upper surface of the upper cover 21 and the lower surface of the lower cover 22) over which air flows during flight of the aircraft 1. Each cover 21, 22 has an inner surface carrying a series of stiffeners 8 extending in the spanwise direction 19 (only some of the stiffeners 8 are labelled so as to improve the clarity of the figures). Each stiffener 8 is joined to one cover 21, 22 but not the other.

The wing box 20 has a plurality of transverse ribs, each rib being joined to the covers 21, 22 and the spars 6, 7. The ribs 10 may include an inner-most inboard rib 10a located at the root of the wing box 20, an outer-most rib 10c at the tip of the wing box 20, and one or more mid-span ribs 10b between the inner-most and outer-most ribs 10a, 10c. The inner-most rib 10a may be an attachment rib which forms the root of the wing box 20 and is joined to a centre wing box 18 within the body of the fuselage 4. Each rib 10a, 10b, 10c may connect the upper cover 21 to the lower cover 22. The stiffeners 8 may pass through rib recesses (not shown) in the ribs 10b.

A pipe assembly 30 extends through one of more of the wing ribs 10a, 10b, 10c, for example between an aircraft engine and a fuel tank, or a refuelling coupler and the fuel tank. The pipe assembly 30 extends in a generally spanwise direction between the root of the wing 3 to the tip of the wing 3.

Figure 4:
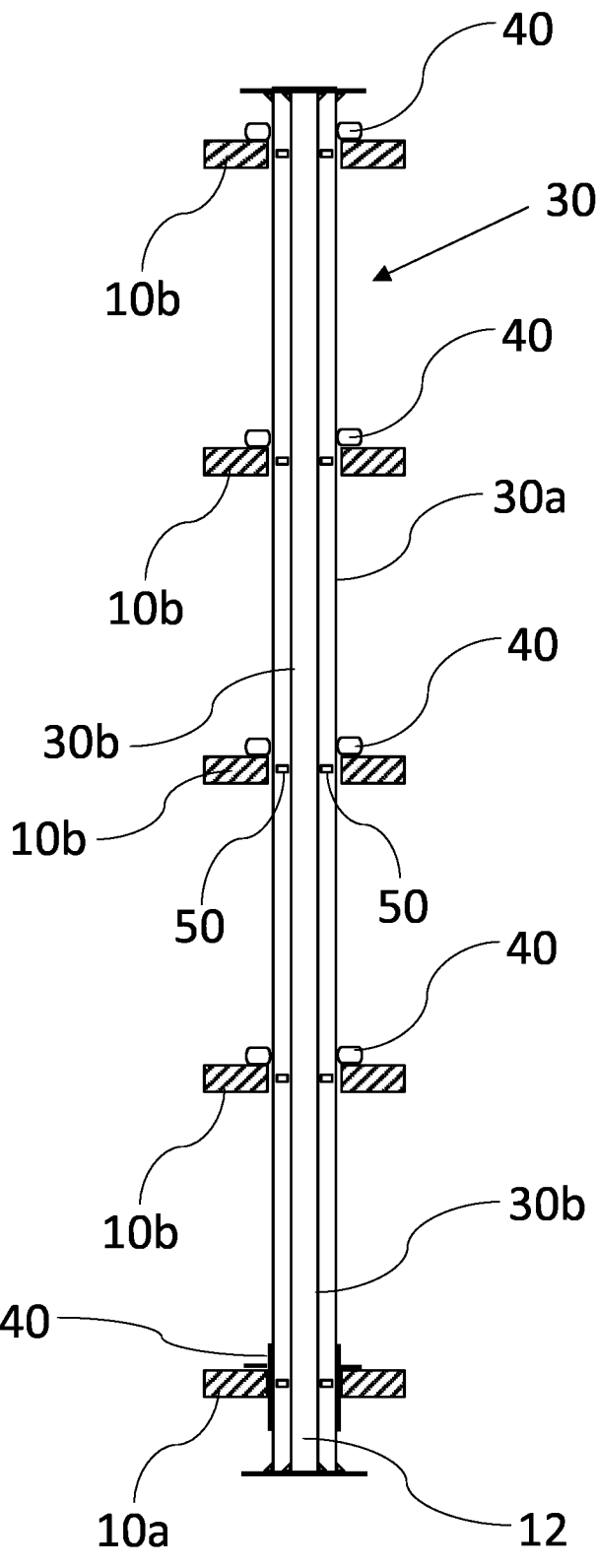
FIG. 4 shows a pipe assembly routed through the wing box.

FIG. 4 is a schematic cross-sectional view showing the pipe assembly 30 extending through the inboard rib 10a at the root of the wing 3, and a series of four of the mid-span ribs 10b. In particular, the pipe assembly 30 passes through the plane of each rib 10a, 10b. The pipe assembly 30 may pass through an aperture (not shown) in each of the ribs 10a, 10b.

The pipe assembly 30 is double-walled with an outer pipe 30a and an inner pipe 30b enveloped by the outer pipe 30a. The pipes 30a, 3b are preferably formed of a material with low thermal expansion coefficient, such as stainless steel.

The inner pipe 30b is arranged to carry cryogenic fuels, such as liquid hydrogen. To maintain the cryogenic fuel at the required low temperatures, it is important to minimise thermal losses from the pipe assembly 30. To achieve this, the interspace between the outer pipe 30a and the inner pipe 30b may be held at a vacuum pressure.

Pipe spacers 50 are fitted between the outer pipe 30a and the inner pipe 30b to keep the outer and inner pipes 30a, 30b coaxial and transmit radial loads between them, and are generally distributed at intervals along the length of the pipe assembly 30.

The pipe assembly 30 is coupled to each rib 10a, 10b by a fixture arrangement 40.

The fixture arrangement 40 associated with the inboard rib 10a is configured to restrict translational movement of the pipe assembly 30 in the longitudinal direction relative to the rib 10a, restrict translational movement of the pipe assembly 30 in the plane of the rib 10a (i.e. radial movement from a longitudinal axis 12 of the pipe assembly 30), and allow rotation of the pipe assembly 30 relative to the rib 10a about the longitudinal axis 12. By restricting movement of the pipe assembly 30a along the longitudinal axis 12 at one or more points (in this case only the inboard rib 10a), the pipe assembly 30 is prevented from sliding freely through the wing box 20.

The fixture arrangements 40 associated with the mid-span ribs 10b is configured to restrict translational movement of the pipe assembly 30 in the plane of the rib 10b (i.e. radial movement from a longitudinal axis 12 of the pipe assembly 30), but allows translational movement in the longitudinal direction (i.e. the direction of the longitudinal axis 12a) and rotation about three perpendicular axes.

In this manner, the pipe assembly 30 is simply supported by the fixture arrangements 40 such that shear loads are transmitted from the aircraft wing structure, through the ribs 10a, 10b, to the pipe assembly 30, whilst bending loads are minimised or mitigated. This can be particularly important in cryogenic application due to the increased thickness of the fuel pipes 30a, 30b generally required compared to fuel pipes in non-cryogenic applications. These fuel pipes 30a, 30b may be formed of relatively stiff materials such as metals, and for example stainless steel.

Figure 5:
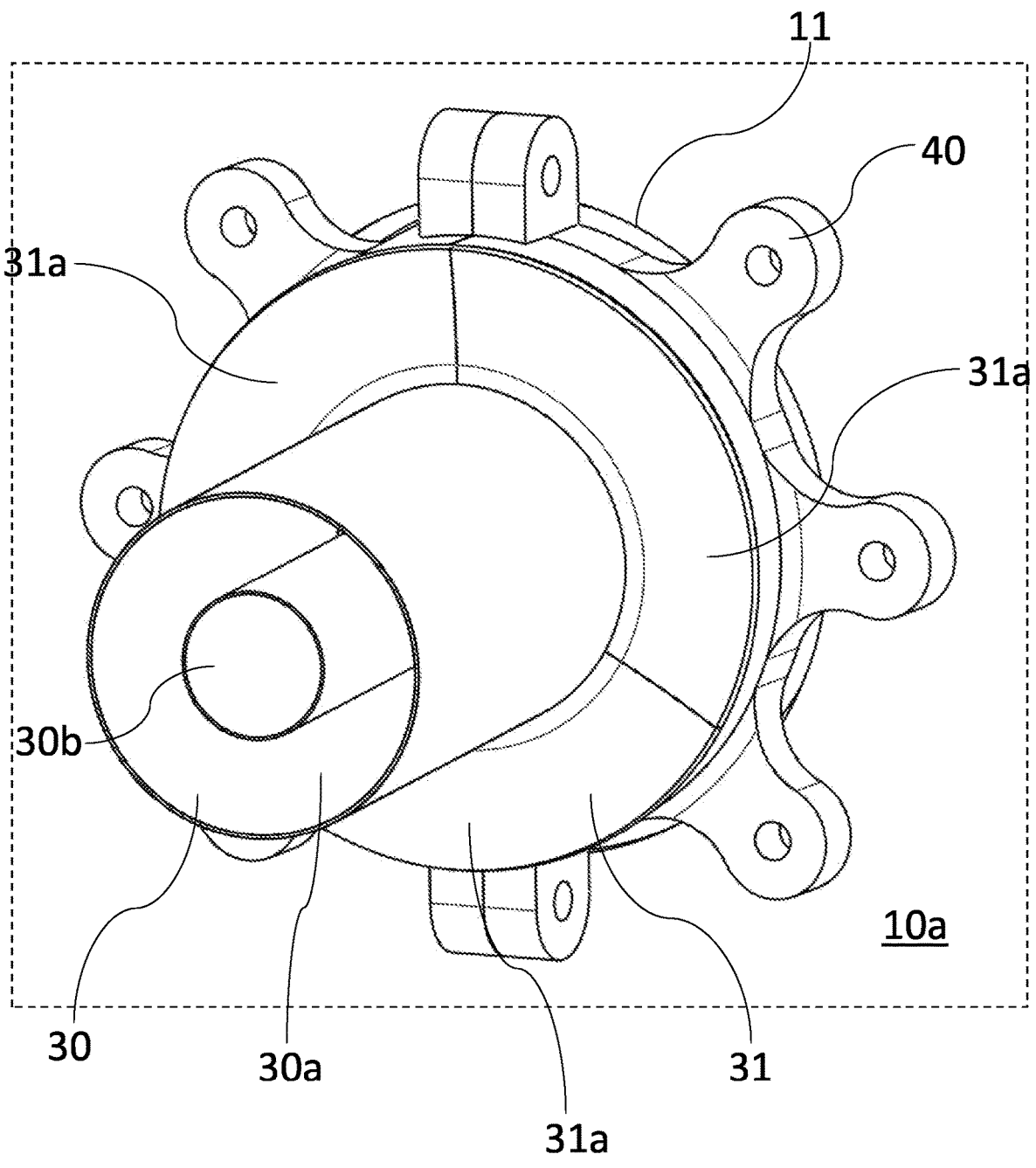
FIG. 5 shows a fixture arrangement coupling the pipe assembly to the wing rib.

FIG. 5 shows the pipe assembly 30 attached to the inboard rib 10a by a fixture arrangement 40. The pipe assembly 30 may extend through a hole 11 in the rib 10a (as shown) or extend adjacent to the rib 10a. The fixture arrangement 40 is configured to restrict translational movement of the pipe assembly 30 in the longitudinal direction relative to the rib 10a in combination with an stopper element 31 (that will be discussed in further detail below), restrict translational movement of the pipe assembly 30 in the plane of the rib 10a (i.e. radial movement from a longitudinal axis 12 of the pipe assembly 30), and allow rotation of the pipe assembly 30 relative to the rib 10a about the longitudinal axis 12 and in axes perpendicular to the longitudinal axis 12, as will be describe in more detail with reference to FIG. 8-10.

Figure 6:
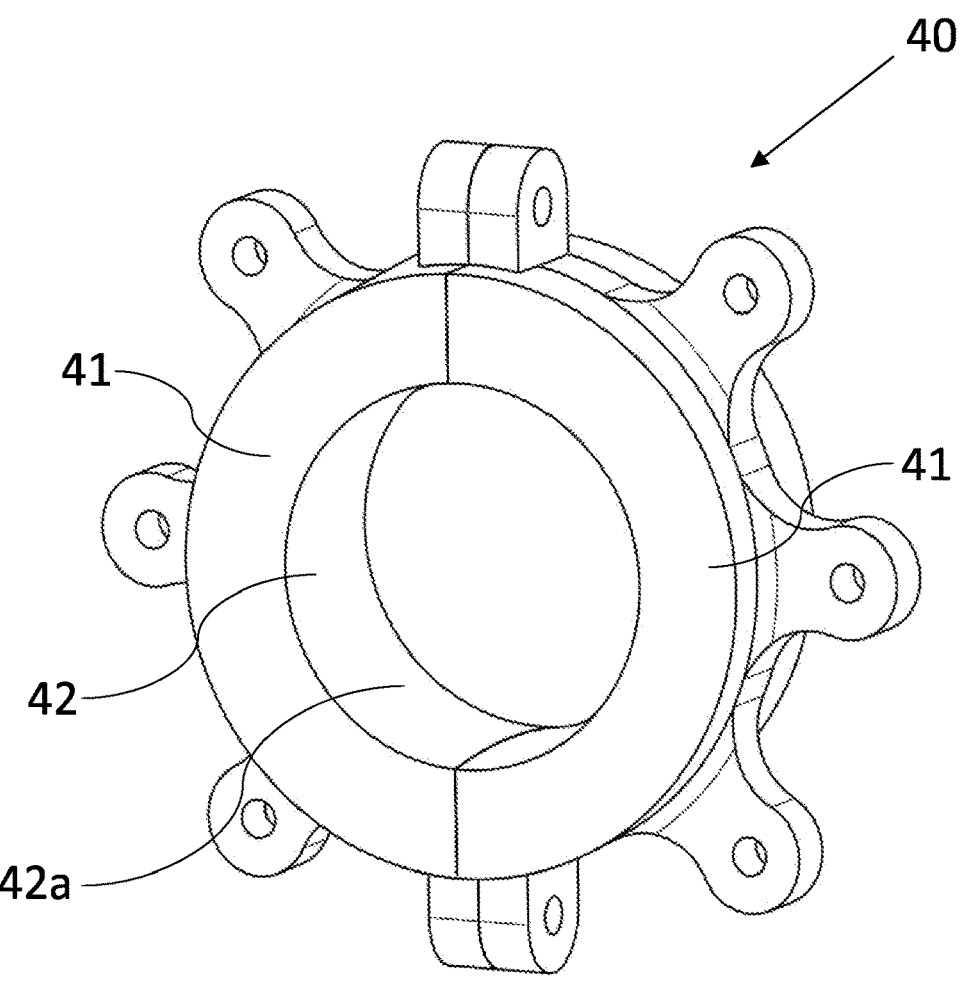
FIG. 6 shows the fixture arrangement in perspective view.
Figure 7:
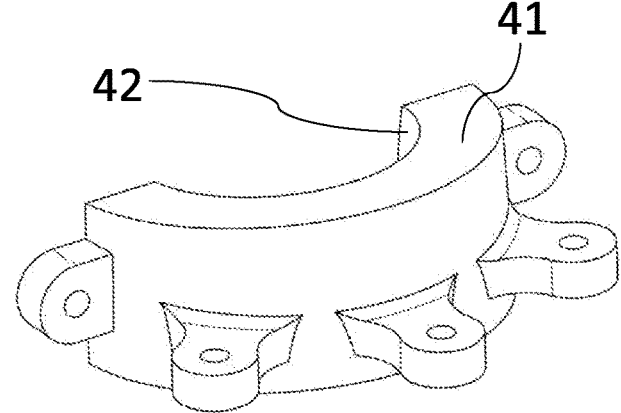
FIG. 7 shows a half-portion of the fixture arrangement.

As shown by way of example in FIGS. 6 and 7, each fixture arrangement 40 may comprise a pair of generally C-shaped parts 41 that are brought together around the pipe assembly 30 to provide minimal contact that allows the pipe assembly 30 to slide, or at least lightly grip the outer pipe 30a.

Figure 8:
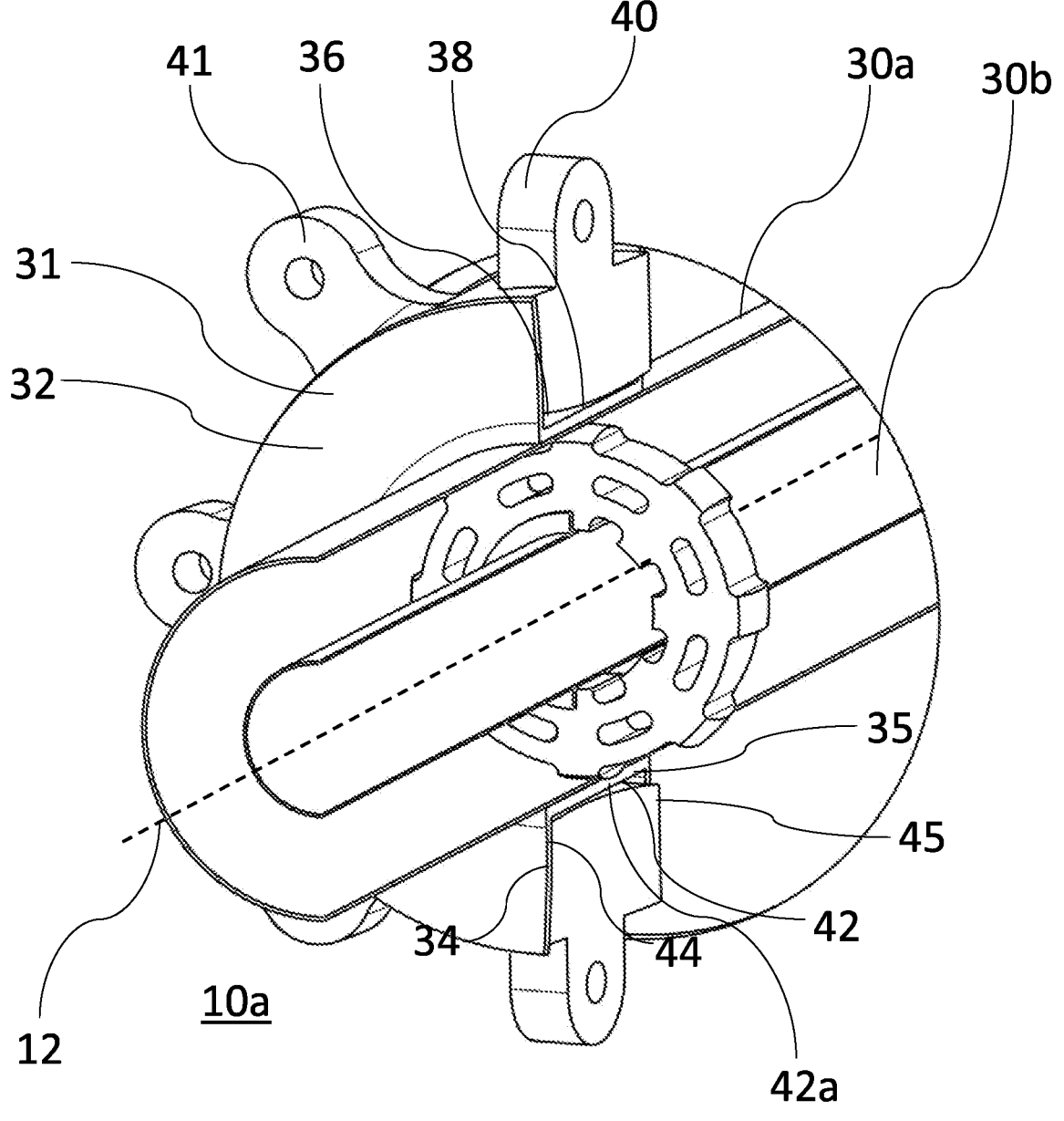
FIG. 8 shows a cut-through view of the pipe assembly attached to the wing rib by the fixture arrangement.

Each of the generally C-shaped parts 41 has an internal face 42 that faces the pipe assembly 30 (See FIG. 8). This collar 38 is itself fixedly attached to the outer pipe 30a. Each internal face 42 is rounded in the spanwise direction, such that the fixture arrangement 40 contacts the pipe assembly 30 via a curved bearing surface 42a having curvature in two orthogonal directions. As the curved bearing surface 42a contacts a cylindrical bearing surface 36 of the pipe assembly 30 (See FIG. 8), the curved bearing surface 42a provides freedom for the pipe assembly 30 to rotate relative to the fixture arrangement 40 about three perpendicular axes. In particular, the bearing surface 36 of the pipe assembly 30 is able to roll across the curved bearing surface 42a of the fixture arrangement 40. This helps to accommodate bending and/or twisting of the wing 3.

Each part 41 of the fixture arrangement 40 is formed with a low-friction material. Whilst the bearing surfaces 36, 42a are arranged in rolling contact, at least some sliding contact may occur. The low-friction material enables the pipe assembly 30 to move with a low-friction sliding interaction against the internal face 42 of the fixture arrangement 40. This further helps to accommodate bending and/or twisting of the wing 3 by minimising the loads transmitted into the inboard rib 10a.

The collar 38 extends between first and second stop members 32, 33 to form a generally C-shaped stopper element 31, with the fixture arrangement 40 therebetween. The stopper element 31 may be integrally formed. The collar 38 is fixedly attached to the outer pipe 30a, with the stop members 32, 33, in the form of flanges, configured to restrict axial movement of the pipe assembly 30 relative to the fixture arrangement 40. In particular, a contact surface 34 of the first stop member 32 abuts a first contact surface 44 of the fixture arrangement 40 and a contact surface 35 of the second stop member 33 abuts a second contact surface 45 of the fixture arrangement 40. The collar 38 is symmetrical about a central plane, such that the pipe assembly 30 has a plane of symmetry that lies between the first and second stop members 32, 33.

The stop members 32, 33 provide a simple, compact and lightweight solution to restricting axial movement of the pipe assembly 30 relative to the fixture arrangement 40 whilst allowing relative rotation between the pipe assembly 30 and the fixture arrangement 40. The arrangement may be designed to provide for any suitable limit of permitted relative rotation between the pipe assembly 30 and the fixture arrangement 40, although generally the rotation is less than 5 degrees or less than 3 degrees. This maintains the compact size of the arrangement whilst allowing sufficient relative rotation to take into account the bending strains of the wing 3.

As shown in FIG. 5, the stopper element 31 may be formed of a plurality of parts 31a that are arranged circumferentially. In other words, the parts 31a of the member 31 each contact a respective portion of the circumference of the outer pipe 30a. This segmentation provides redundancy in the event of failure of one of the parts 31a.

Figure 9:
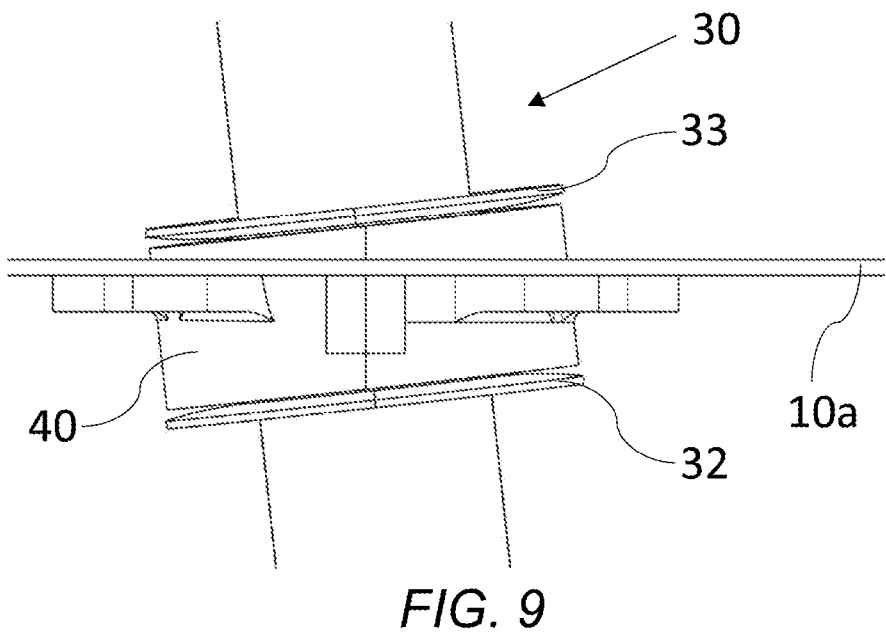
FIG. 9 shows a pipe assembly extending through a wing rib at an oblique angle.
Figure 10:
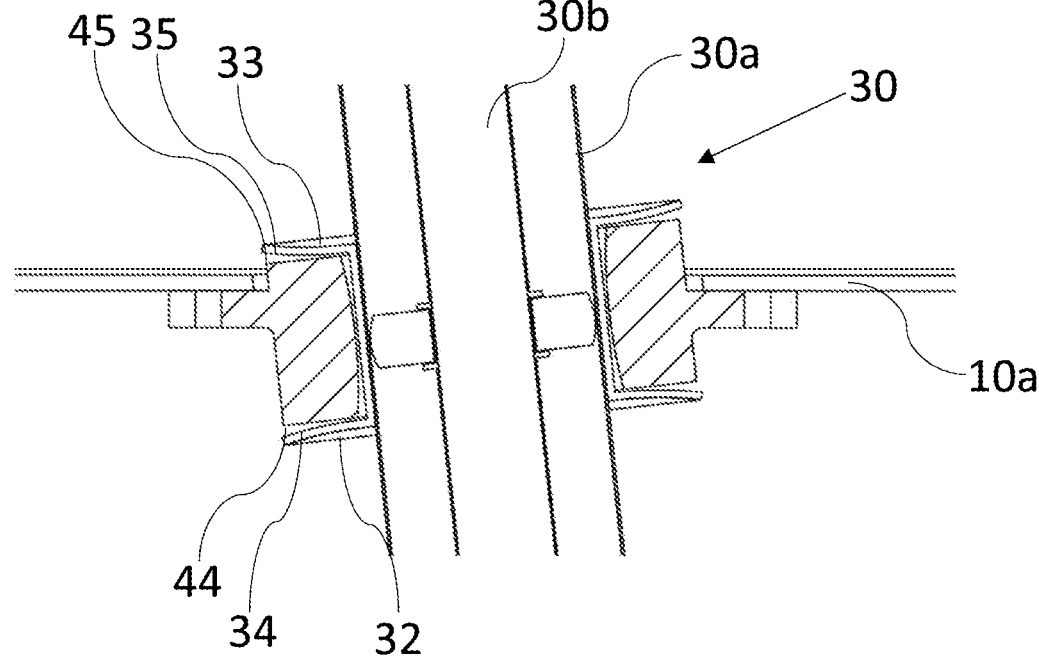
FIG. 10 shows a cross-sectional view of the pipe assembly attached to the wing rib by the fixture arrangement.

The examples shown in FIG. 5 and FIG. 8 show the pipe assembly 30 extending substantially normal to the plane of the rib 10a, however it will be appreciated that the pipe assembly 30 may pass through the rib 10a at an oblique angle, such as shown in the examples of FIGS. 9 & 10.

To accommodate rotation of the pipe assembly 30 about three perpendicular axes, and in particular the two axes perpendicular to the longitudinal axis 12 of the pipe assembly 30, whilst restricting restrict translational movement of the pipe assembly 30 in the longitudinal direction relative to the rib 10a, the distance between the contact surfaces 44, 45 of the fixture arrangement 40 and the respective contact surfaces 34, 35 of the stop members 32, 33 increases radially from the longitudinal axis 12 of the pipe assembly 30. Specifically, the distance between the first contact surface 44 of the fixture arrangement 40 and the contact surface 34 of the first stop member 32 increases radially from the longitudinal axis 12 of the pipe assembly 30, and the distance between the second contact surface 45 of the fixture arrangement 40 and the contact surface 35 of the second stop member 32 increases radially from the longitudinal axis 12 of the pipe assembly 30.

As the distance between contact surfaces 44, 45 and the respective stop members 32, 33 increases radially, the pipe assembly 30 is able to rotate about an axis perpendicular to the longitudinal pipe axis 12 whilst simultaneously restricting lateral movement of the pipe assembly 30 along the longitudinal axis 12 of the pipe assembly 30.

The contact surfaces 34, 35 of the stop members 32, 33 are angled relative to a plane normal to the longitudinal pipe axis 12, whilst the contact surfaces 44, 45 of the fixture arrangement 40 lie on a plane normal to the longitudinal pipe axis 12. Alternatively, the contact surfaces 44, 45 of the fixture arrangement 40 may be angled relative to a plane normal to the longitudinal pipe axis 12. The advantage of only angling the contact surfaces 34, 35 of the stop members 32, 33 rather than the contact surfaces 44, 45 of the fixture arrangement 40, is that the complexity of the fixture arrangement 40 can be reduced, thereby reducing stress concentrations on a fixture arrangement 40. The fixture arrangement 40 is intended to carry the majority of the loads between the pipe assembly 30 and the rib 10a. In contrast, the stop members 32, 33 primarily carries axial loads, i.e. loads along the longitudinal axis 12 of the pipe assembly 30.

Figure 11A:
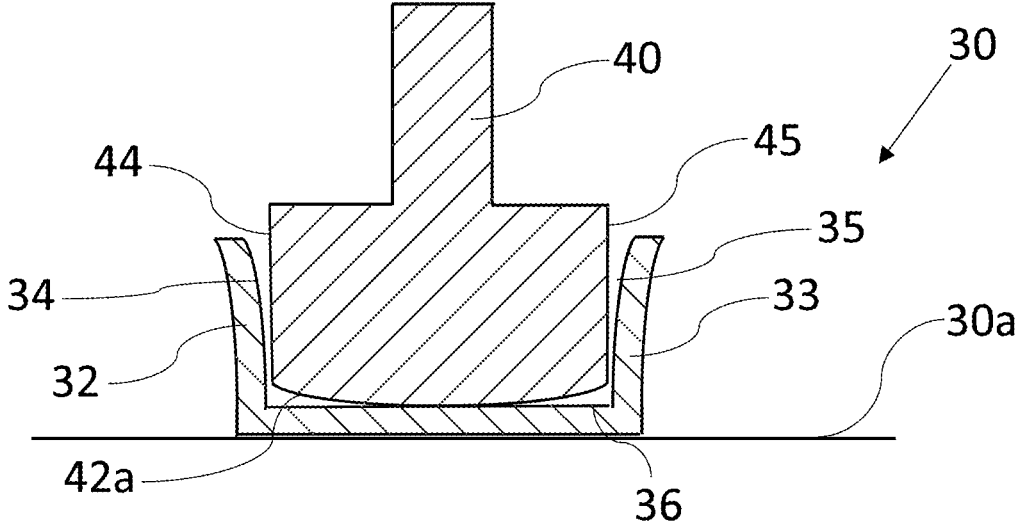
FIG. 11A shows a first configuration of the pipe assembly relative to the fixture arrangement.
Figure 11B:
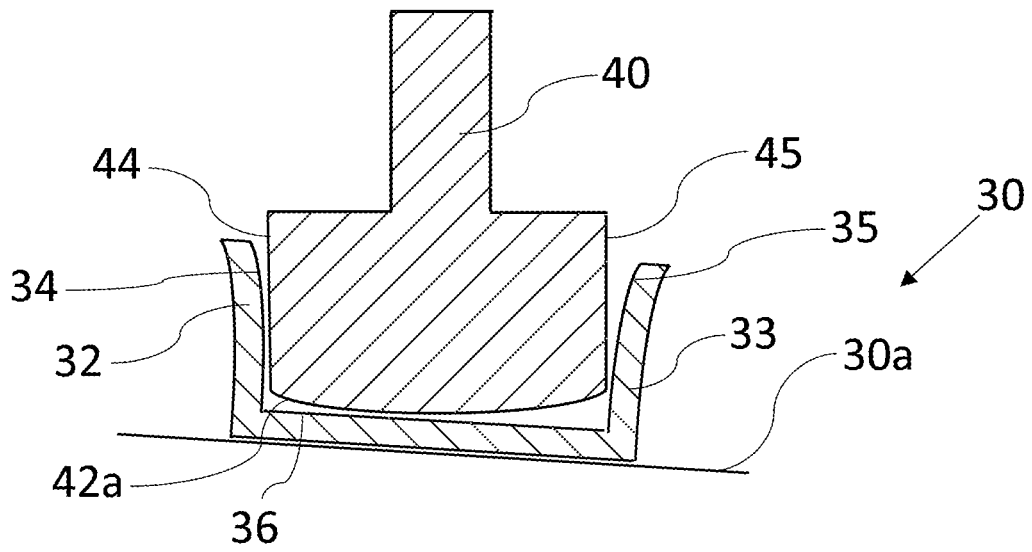
FIG. 11B shows a second configuration of the pipe assembly relative to the fixture arrangement.
Figure 11C:
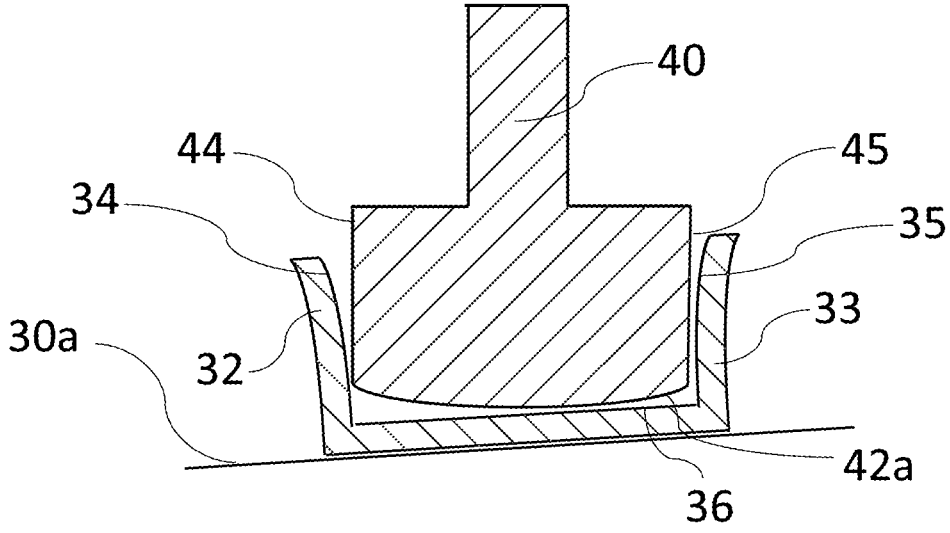
FIG. 11C shows a third configuration of the pipe assembly relative to the fixture arrangement.

An example of the rotation of the pipe assembly 30 is shown in FIGS. 11a-11C, which show the pipe assembly 30 rotated into three different configurations relative to the fixture arrangement 40 whilst maintaining the general longitudinal position of the pipe assembly 30 relative to the fixture arrangement 40. The distance between the contact surfaces 44, 45 of the fixture arrangement 40 and the contact surfaces 34, 35 of the stop members 32, 33 increases exponentially, with each contact surface 34, 35 of the stop members 32, 33 curved in two orthogonal directions. The exponential increase of the distance can allow contact between the respective contact surfaces 34, 34, 44, 45 to be maintained as the pipe assembly 30 is rotated relative to the fixture arrangement 40 whilst minimising stress concentrations that might otherwise occur if the contact surfaces 34, 35 were planar.

To maintain contact between the contact surfaces 44, 45 of the fixture arrangement 40 and the contact surfaces 34, 35 of the stop members 32, 33 at all rotational angles of the pipe assembly 30, whilst minimising translational movement of the pipe assembly 30 along the longitudinal axis 12 of the pipe assembly 30 relative to the rib 10a and minimising stress concentrations, the curvature of the curved bearing surface 42a may match the curvature of the contact surfaces 34, 35 of the stop members 32, 33. For example, the radius of curvature of the curved bearing surface 42a and the contact surfaces 34, 35 of the stop members 32, 33 may be the same.

Even so, the fixture arrangement 40 and stop members 32, 33 may be arranged so as to provide at least some relative play therebetween, which can be set depending on manufacturing tolerances and thermal effects, although generally axial movement of the pipe assembly 30 relative to the fixture arrangement 40 will be restricted by the first and second stop members 32, 33 such that axial movement is no greater than 10 mm, and preferably no greater than 5 mm. To minimise bearing stresses, and mitigate the effects of manufacturing tolerances, the fixture arrangement 40 and stop members 32, 33 may be arranged so as to provide at least 2 mm, and optionally 4 mm of axial movement.

It will be clear to the skilled person that the examples described above may be adjusted in various ways. For example, the fixture arrangement 40 is described as having a curved bearing surface 42a that contacts a cylindrical bearing surface 36 of the pipe assembly 30, however it will be appreciated that the bearing surface 36 of the pipe assembly 30 may be curved whilst the bearing surface 42a of the fixture arrangement 40 is cylindrical. The combination of cylindrical and curved bearing surfaces minimises the contact area between the fixture arrangement 40 and pipe assembly 30, thereby reducing thermal transfer. Alternatively, an exclusively sliding contact may be formed between the pipe assembly 30 and the fixture arrangement 40 by providing respective bearing surfaces 36, 42a that are correspondingly curved.

The stop members 32, 33 are described as part of a stopper element 31 that also includes a collar 38, with that collar 38 forming the bearing surface 36 of the pipe assembly 30. However, it will be appreciated that the pipe assembly 30 may not include a collar 38, such that the bearing surface 36 is formed on the outer pipe 30a.

It will be appreciated that the pipe assembly 30 may include a single stop member 32, 33 in some examples, particularly those examples in which the axial restriction of the pipe assembly 30 relative to the fixture arrangement 40 is not of concern.

The examples describe above have focused on a fixture arrangement 40 attached to a wing rib 10a, 10b, however it will be appreciated that the pipe spacer 50 may be suitably applied to a pipe assembly 30 in combination with a range of aircraft structures, including fairing ribs (leading or trailing edge fairings that are outside of the main wing box 20 of the wing 3) and fuselage frames.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft assembly comprising:
an aircraft structure;
a pipe assembly with a bearing surface and a longitudinal pipe axis; and
a fixture arrangement attached to the aircraft structure, the fixture arrangement contacting the pipe assembly via a curved bearing surface having curvature in two orthogonal directions, wherein the curved bearing surface contacts the bearing surface of the pipe assembly, and the curved bearing surface is configured to enable the pipe assembly to rotate relative to the fixture arrangement about three perpendicular axes; and
a stop member adjacent the fixture arrangement, wherein a contact surface of the stop member is configured to abut a contact surface of the fixture arrangement to restrict axial movement of the pipe assembly relative to the fixture arrangement,
wherein a gap between the contact surface of the fixture arrangement and the contact surface of the stop member increases radially from the longitudinal pipe axis.

2. The aircraft assembly of claim 1, wherein the gap between the contact surface of the fixture arrangement and the contact surface of the stop member increases exponentially.

3. The aircraft assembly of claim 1, wherein the contact surface of the stop member is angled relative to a plane normal to the longitudinal pipe axis.

4. The aircraft assembly of claim 1, wherein the contact surface of the fixture arrangement lies on a plane normal to the longitudinal pipe axis.

5. The aircraft assembly of claim 1, wherein the contact surface of the stop member is curved in two orthogonal directions.

6. The aircraft assembly of claim 1, wherein a curvature of the curved bearing surface matches a curvature of the contact surface of the stop member.

7. The aircraft assembly of claim 1, wherein the curved bearing surface is on the fixture arrangement.

8. The aircraft assembly of claim 7, wherein the bearing surface of the pipe assembly is a cylindrical bearing surface and the curved bearing surface contacts the cylindrical bearing surface of the pipe assembly.

9. The aircraft assembly of claim 1, wherein the aircraft structure is a wing rib, fairing rib, or fuselage frame.

10. An aircraft comprising the aircraft assembly of claim 1.

11. The aircraft assembly of claim 1, wherein the stop member is adjacent a sidewall of the fixture arrangement, the contact surface of the stop member abuts a contact surface on the sidewall of the fixture arrangement to restrict the axial movement of the pipe assembly relative to the fixture arrangement, and the sidewall of the fixture arrangement extends radially outward beyond the bearing surface of the fixture arrangement in a direction perpendicular to the longitudinal pipe axis.

12. The aircraft assembly of claim 1, wherein the curved bearing surface has a convex curvature along a direction parallel to the longitudinal pipe axis.

13. An aircraft assembly comprising:
an aircraft structure;
a pipe assembly; and
a fixture arrangement attached to the aircraft structure, the fixture arrangement contacting the pipe assembly via a curved bearing surface having curvature in two orthogonal directions, wherein the curved bearing surface is configured to enable the pipe assembly to rotate
relative to the fixture arrangement about three perpen-
dicular axes, and
a stop member adjacent the fixture arrangement, wherein
a contact surface of the stop member is configured to
abut a contact surface of the fixture arrangement to
restrict axial movement of the pipe assembly relative to
the fixture arrangement,
wherein a gap between the contact surface of the fixture
arrangement and the contact surface of the stop mem-
ber increases radially from the longitudinal pipe axis,
and
wherein the stop member is formed of two or more parts
that interconnect circumferentially.
14. The aircraft assembly of claim 13, wherein axial
movement of the pipe assembly relative to the fixture
arrangement is restricted by the first and second stop mem-
bers with axial movement no greater than 10 mm.
15. The aircraft assembly of claim 13, wherein axial
movement of the pipe assembly relative to the fixture
arrangement is restricted by the first and second stop mem-
bers with axial movement of at least 2 mm.
16. The aircraft assembly of claim 13, wherein the pipe
assembly comprises an inner pipe within an outer pipe.
17. The aircraft assembly of claim 16, comprising a
cryogenic fuel in the inner pipe.
18. The aircraft assembly of claim 17, wherein the cryo-
genic fuel is liquid hydrogen.
19. The aircraft assembly of claim 16, comprising a
vacuum pressure between the inner pipe and the outer pipe.
20. An aircraft assembly comprising:
an aircraft structure;
a pipe assembly;
a fixture arrangement attached to the aircraft structure, the
fixture arrangement contacting the pipe assembly via a curved bearing surface having curvature in two
orthogonal directions, wherein the curved bearing sur-
face is configured to enable the pipe assembly to rotate
relative to the fixture arrangement about three perpen-
dicular axe, and
a stop member adjacent the fixture arrangement, wherein
a contact surface of the stop member is configured to
abut a contact surface of the fixture arrangement to
restrict axial movement of the pipe assembly relative to
the fixture arrangement;
wherein a gap between the contact surface of the fixture
arrangement and the contact surface of the stop mem-
ber increases radially from the longitudinal pipe axis;
wherein the pipe assembly comprises a second stop
member adjacent the fixture arrangement such that the
fixture arrangement is between the first and second stop
members,
wherein a contact surface of the second stop member is
configured to abut a second contact surface of the
fixture arrangement to restrict axial movement of the
pipe assembly relative to the fixture arrangement, and
wherein a gap between the contact surface of the fixture
arrangement and the contact surface of the second stop
member increases radially from the longitudinal pipe
axis.
21. The aircraft assembly of claim 20, wherein the pipe
assembly has a plane of symmetry that lies between the first
and second stop members.
22. The aircraft assembly of claim 20, wherein the first
and second stop members are connected by a collar, the
collar includes the bearing surface in contact with the fixture
arrangement at the curved bearing surface, and the collar is
a component of the pipe assembly.

* * * * *